United States Patent [19]
Payne et al.

[11] Patent Number: 5,793,919
[45] Date of Patent: Aug. 11, 1998

[54] OPTICAL BACKPLANE INTERCONNECT

[75] Inventors: Roger A. Payne; Fiona Mackenzie; Michael J. Hodgson, all of Ipswich, England

[73] Assignee: British Telecommunications public limited company, London, England

[21] Appl. No.: 682,730

[22] PCT Filed: Jan. 25, 1995

[86] PCT No.: PCT/GB95/00141

§ 371 Date: Sep. 23, 1996

§ 102(e) Date: Sep. 23, 1996

[87] PCT Pub. No.: WO95/20772

PCT Pub. Date: Aug. 3, 1995

[30] Foreign Application Priority Data

Jan. 26, 1994 [EP] European Pat. Off. ............ 94300560.3

[51] Int. Cl.$^6$ .................................................. G02B 6/00
[52] U.S. Cl. ........................ 385/135; 385/134; 385/24; 385/42
[58] Field of Search ........................ 385/16–17, 24, 385/19, 31, 25, 56–57, 42, 64–65, 134–137, 139, 15; 359/173

[56] References Cited

U.S. PATENT DOCUMENTS 4,533,208  8/1985  Stowe ........................... 385/46
4,943,136  7/1990  Popoff .......................... 385/46
5,596,662  1/1997  Boscher ......................... 385/55

FOREIGN PATENT DOCUMENTS 0347037  12/1989  European Pat. Off. .
0382430   8/1990  European Pat. Off. .

OTHER PUBLICATIONS

MacKenzie et al, "Dichroic Tap For Optical Multiple Access Systems with Distributed Amplification", Electronics Letters, 17th Jan. 1991, vol. 27, No. 2, pp. 181–183.
Sakakibara et al, "A Slotted Aloha With Multiple Common Receivers Over AWGN Rayleigh–Fading Channels", IEEE, 1989, pp. 0418–0422 No Month Available.
MacKenzie et al, Optical Interconnect Based on a Fibre Bus, Optical and Quantum Electronics, 24 (1992), pp. S491–S–504 No Month Available.

Primary Examiner—Hemang Sanghavi
Attorney, Agent, or Firm—Nixon & Vanderhye, P.C.

[57] ABSTRACT

An optical backplane interconnect comprises a backplane comprising parallel D-fibers (1) that form an optical bus embedded in a plastics substrate (15), which form a coupling with respective parallel D-fibers (23) at an angle Φ in a connecting block (21) that is mounted on a card (2). Circuit components on the card are connected by optical fibers (9) to the fibers in the connecting block. The card is held by connections (18, 19), and as the card is pushed into position, coupling means, comprising balls (25, 26) on the connecting block, it self-aligns in groove (27) on the backplane, to set the angle Φ between the fibers, to provide a controlled, reliable optical coupling.

23 Claims, 4 Drawing Sheets

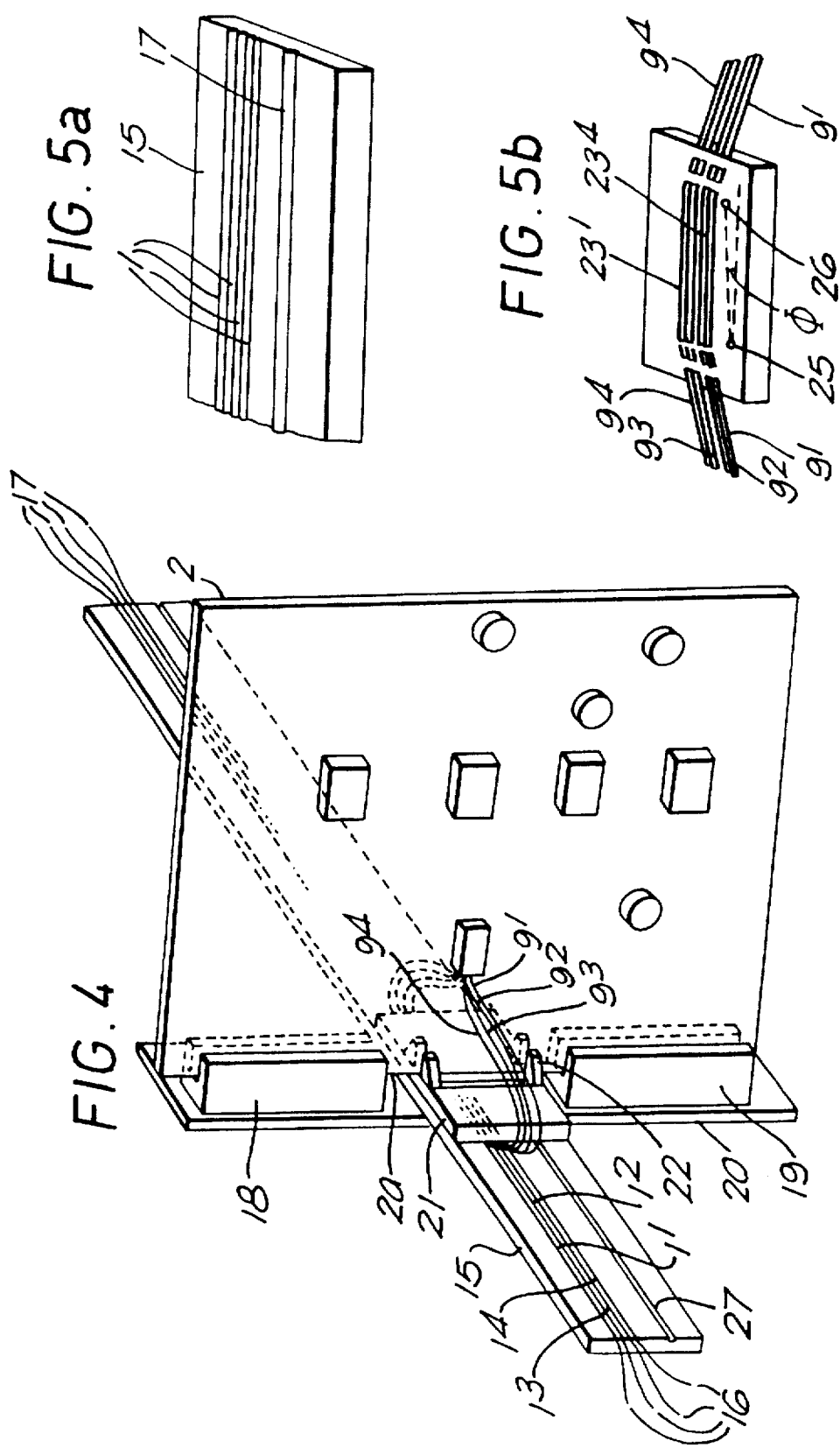

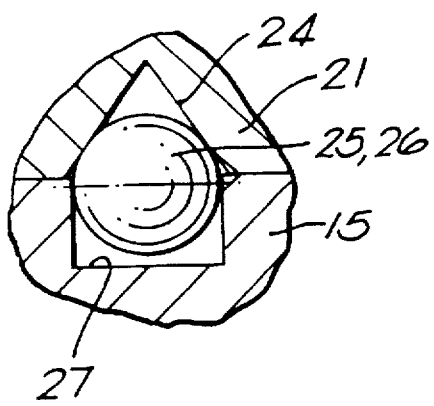
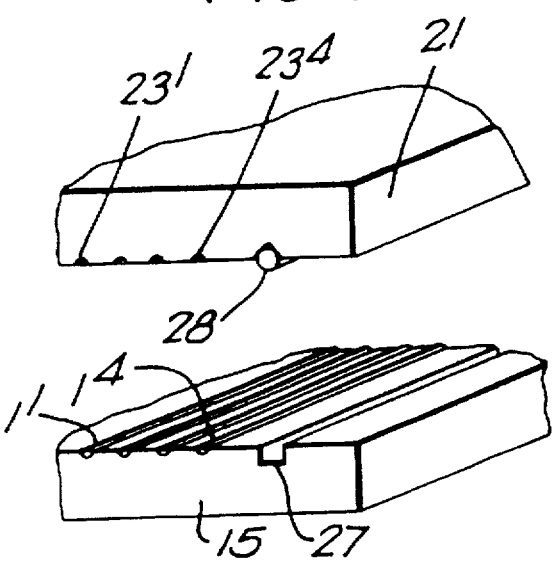
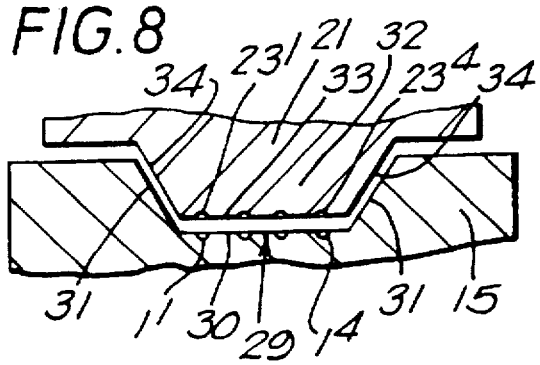
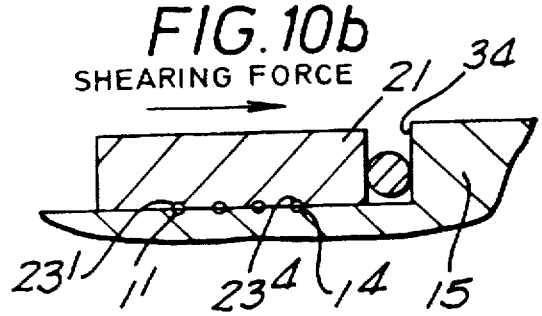
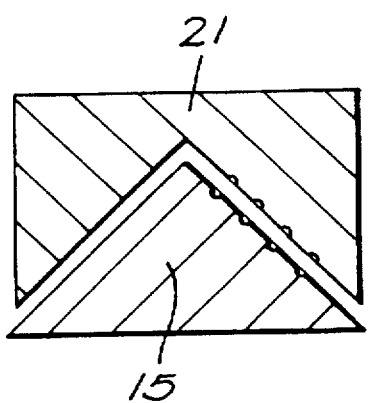
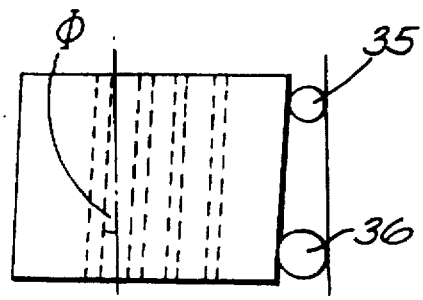

OPTICAL BACKPLANE INTERCONNECT

FIELD OF THE INVENTION

This invention relates to an optical backplane interconnect that has particular but not exclusive application to optical telecommunication networks.

BACKGROUND

In order to connect all the nodes of a network to one another, a large number of connections is usually required, which becomes impractical if individual optical fibres are used to make the connections. In order to simplify the node connections, an optical bus architecture has been proposed in "Optical Interconnect based on a Fibre Bus" F. MacKenzie et al—Optical and Quantum Electronics 24 (1992) S 491-S 504. This discloses an optical bus consisting of a plurality of parallel D-section optical fibres. Connections are made to the optical fibres by means of further D-section fibres that overlay the fibres of the bus at a predetermined angle. As explained in the paper, the angle of intersection determines the degree of coupling between the fibres and the arrangement permits signals to be selectively coupled into and from the bus. The connections can be arranged in groups, to provide a modular structure. The circuitry is arranged on separate cards that carry both optical and electrical circuits, which are connected to the optical fibre bus and the cards can be arranged in a racked arrangement in a similar manner to conventional electrical printed circuit boards in a telephone exchange. Reference is also directed to EP-A-0382430 which shows a similar arrangement.

However, problems have been encountered in designing an interconnect which provides a consistent and reliable coupling to the optical fibre bus and as a result, when cards are removed and reinserted, or inserted in different locations in the rack, the optical coupling to the bus may change undesirably.

The present invention seeks to overcome these problems.

SUMMARY OF THE INVENTION

In accordance with the present invention there is provided an optical backplane interconnect comprising: a backplane including a plurality of optical bus waveguides; a connecting block provided with a plurality of optical paths to be aligned in a predetermined angular relationship with the bus waveguides of the backplane so as to form optical couplings therewith; and characterised by coupling means operative in such a manner that as the connecting block is moved in a forward direction towards the backplane, the block is caused automatically to shift laterally of said forward direction so as to produce self-alignment of the waveguides and the paths in said predetermined angular relationship.

The interconnect may include a card, a support on which the backplane is mounted, and mounting means on the support for the card, the coupling means being resiliently mounted on the card and operative so that as the card is moved in the forward direction into the mounting means the connecting block moves relative to the card to produce said self alignment.

The backplane may include a plurality of D-section optical fibres which in the region of the connecting block are generally parallel to one another, and the optical paths in the connecting block may include portions that are generally parallel and spaced for coupling with respective ones of the optical fibres, said coupling means holding the optical path portions at a predetermined angle relative to the optical fibres.

The card can carry optical components connected to said plurality of optical paths. The optical paths may themselves be defined by further D-section optical fibres. The coupling means may comprise a groove in the backplane and projection means on the connecting block, that fits into the groove. The projection means may comprise an elongate member that runs longitudinally of the groove, so as to hold the connecting block at a predetermined angle to the backplane. Alternatively, the projection means may comprise one or more spaced members that fit into the groove. The or each spaced member may comprise a ball received in a recess in the connecting block.

In an alternative configuration, the channel in the backplane may be wider than the aforesaid groove, with the optical fibres being arranged in the channel.

The card may comprise a network card that carries both optical and electrical circuit components, in which case the mounting means for the card can comprise an electrical edge connector mounted on the support to receive the network card. The edge connector can itself be connected to an electrical bus.

In another aspect the invention includes an optical network interconnect comprising: a support, a backplane mounted on the support, the backplane including a plurality of optical fibres, a network card, an edge connector mounted on the support to receive the network card, a connecting block mounted on the network card and provided with a plurality of optical paths to be coupled to the optical fibres in the backplane respectively, and coupling means comprising a mutually cooperating coupling member and receptacle arrangement which provides a coupling between the connecting block and the backplane in a predetermined configuration, whereby to couple the optical paths of the connecting block to the optical fibres in the backplane, such that upon insertion of the card into the edge connector, the coupling means is operative to couple the connecting block to the backplane in said predetermined configuration.

BRIEF DESCRIPTION OF THE DRAWINGS

In order that the invention may be more fully understood, embodiment thereof will now be described by way of example with reference to the accompanying drawings in which:

FIG. 4 is a schematic perspective view of a rack interconnect in accordance with the invention;

FIG. 5 is a schematic perspective view of a connecting block and backplane for use in an interconnect in accordance with the invention;

FIG. 6 is an enlarged sectional view of one of the balls shown in FIG. 5;

FIG. 7 is a schematic perspective view of an alternative connecting block configuration in which the balls are replaced by a half-rod;

FIG. 8 is a schematic sectional view of an alternative optical backplane interconnect in accordance with the invention;

FIG. 9 is a sectional view of yet another embodiment of the invention;

FIG. 10a is a plan view of a further embodiment of interconnect in accordance with the invention;

FIG. 10b is a sectional view of the interconnect shown in FIG. 10a;

DETAILED DESCRIPTION

Figure 1:
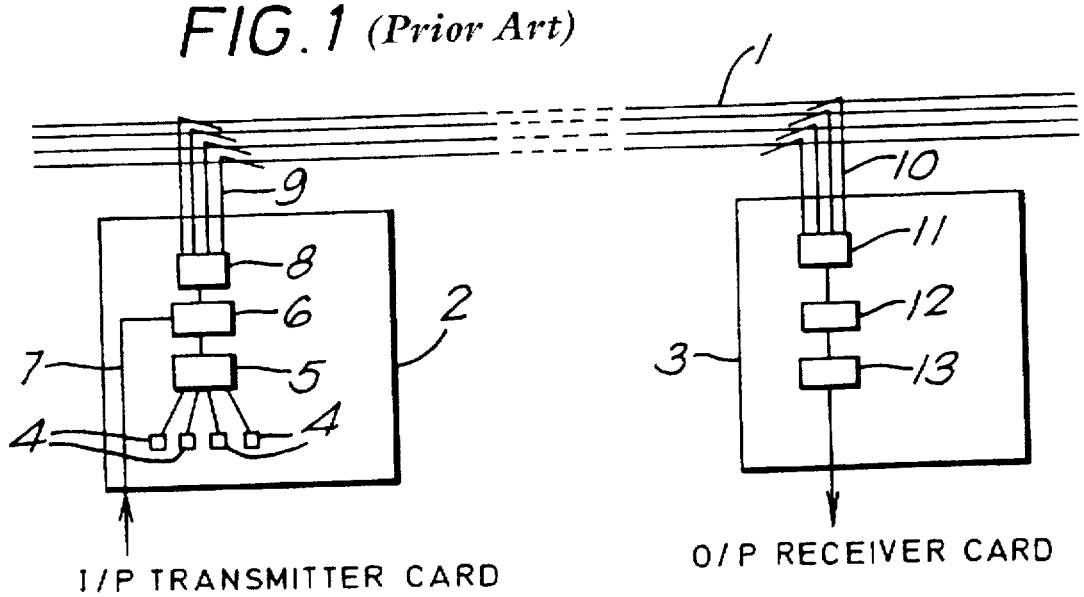
FIG. 1 illustrates a known MONET optical fibre architecture.

Referring to FIG. 1, an optical bus architecture is shown that consists of a bus 1 of optical fibres. An interface to the optical bus is provided by means of network cards which carry optical and electronic sub-systems. In FIG. 1, a transmitter card 2 and a receiver card 3 are shown. This general configuration is known as a MONET system (Multi-dimensional Optical Network) and reference is directed to D. W. Smith et al, Globecon '89 Vol 1, Paper 1.2.1, Dallas, USA. The transmitter card 2 contains a number of wavelength sources 4, typically semiconductor lasers, that provide optical source signals to a wavelength division multiplexer (WDM) 5 which supplies optical signals to a modulator 6 that receives control signals on line 7. An optical space switch 8 supplies output signals to four optical paths, in the form of optical fibres 9 that are coupled to respective fibres of the bus 1.

Similarly, the receiver card 3 includes a plurality of optical fibres 10 that receive signals from the bus 1, connected to a space switch 11 connected to a demodulating optical circuit 12, 13.

As will be explained in more detail hereinafter, the cards can be selectively connected and removed from the bus, providing for an extremely flexible system which can be expanded and modified as required. Interchangeable cards can be designed to achieve wavelength filtering, wavelength re-routing, wavelength translation (receive λ1 and retransmit data at λ2) drop and insert (retransmit at selective channel wavelength λ1) and protection switching either by wavelength re-routing or by wavelength translation.

Figure 2:
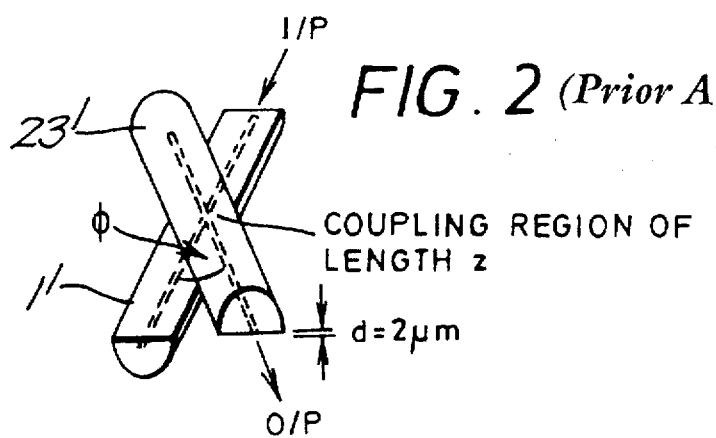
FIG. 2 shows a schematic illustration of a D-fibre cross point.
Figure 3:
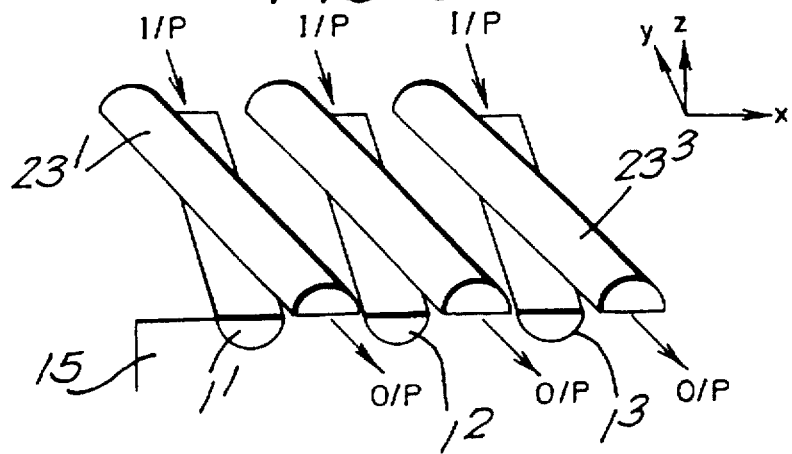
FIG. 3 is a schematic illustration of an array of fibre couplings.

In order to allow the cards to be changed or reconfigured, a suitable coupling between the optical fibres 9, 10 and the fibres of the bus 1 needs to be achieved. This will now be explained with reference to FIGS. 2 and 3. As described in MacKenzie et al supra, optical coupling can be achieved between adjacent lengths of so-called D-fibre that are laid in contact with one another. D-fibre is produced by removing the fibre cladding at the preform stage so as to leave a D-shaped cross section. The preform is then drawn under special conditions so that its geometry is maintained—see Davey S T, "High Quality D-Fibre for Optical Telecommunications" BTTJ, Vol. No. 4 pp 3–9 1990. If two D-fibres are arranged to overlie one another, in contact, as shown in FIG. 2, optical coupling occurs between the fibres and the degree of coupling is dependent upon the angle of intersection, which in turn controls the coupling length. Thus, different degrees of coupling can be achieved by setting a different angle between the fibres. As shown in FIG. 3, an arrayed connector can be formed. The D-fibres $1_1$, $1_2$, $1_3$, can be laid in parallel, equally spaced, preformed grooves in a substrate 15, typically formed of plastics material and are then press formed into the substrate by applying a heated moulding plate over the D-fibres, as described in U.S. Pat. No. 5,231,682. The fibre spacing is typically 500 μm. In this way, a backplane can be formed containing the bus. Fibres 23 may similarly be formed into a connecting block, as will be explained in more detail hereinafter. Although arrangements of this general design have been proposed hitherto—see F. MacKenzie et al supra, difficulties have been encountered in designing a practical form of connector in which the angle of intersection of the groups of fibres can be maintained in a predictable and controllable way so that when individual cards are changed, the same optical coupling occurs.

The optical backplane interconnect shown in FIG. 4 provides a solution to these problems. As shown in FIG. 4, an optical backplane 15 which contains four optical D-section fibres 1 which are spliced to conventional fibres 16, 17 at opposite ends of the backplane, the splices being buried in the plastics material 15 of the backplane by way of protection. The backplane is manufactured as described in our U.S. Pat. No. 5,231,682 aforesaid. The backplane is also provided with an elongate channel in the form of a groove 27 that runs parallel to the D-fibres 1. The structure of the backplane can be seen in more detail in FIG. 5a.

As shown in FIG. 4, the card 2 is mounted adjacent the optical backplane by means of a conventional electrical connectors 18, 19 mounted on a support bar 20 that also receives the backplane 15. The connectors 18, 19 thus grip the card 2 and hold it physically in place. The connectors 18, 19 form electrical contacts with electrical connections on the card 2 (not shown). The connectors 18, 19 may themselves be connected to an electrical bus (not shown).

Optical connection to the optical bus fibres 1 is achieved by means of the fibres 9 and a connector block 21 which is mounted transversely on edge 2a of the card by means of a resilient mounting clip 22. The connector block 21 is formed in a similar manner to the backplane 15, and is shown in more detail in FIG. 5b. The optical fibres 9, which are connected to circuit components on the card 2, extend in a loop, as shown in FIG. 4 from one side of the card to the other through the connecting block 21. Referring now to FIG. 5b, the connecting block 21 includes four parallel, equally spaced D-fibres 23 mounted in grooves (not shown) in the block 21 in the manner previously described, having the fibres 9 spliced thereto at opposite ends, the splices being buried into the block 21 to provide physical protection for the joints.

In order to provide a predetermined alignment of the fibres 23 of the connection block with the fibres 1 of the backplane 15, projections in the form of two ball bearings 25, 26 are mounted on the connecting block 21 to be received into the groove 27 of the backplane 15. As shown in FIG. 5b, the ball bearings 25, 26 are arranged in a line, makes a small angle Φ with the longitudinal direction of the parallel fibres 23 of the connecting block. Thus, this angle Φ constitutes the angle of intersection between the two sets of D-fibres 1, 23 and thus defines the optical coupling between them.

Referring to FIG. 4, it will be seen that the card 2 can be removed and replaced by another and furthermore, additional cards can be connected to the backplane by the provision of further card mountings (not shown). When the card 2 is to be mounted on the backplane, the card, together with the connecting block 21, which is mounted on the edge 2a of the card by the resilient mounting 22, is pushed into the electrical connectors 18, 19 to be received in situ. As a result, the connecting block 21 is pressed in a forward direction towards the backplane 15 and the ball bearings 25, 26 become aligned in the groove 27 thus accurately aligning the D-fibres 1, 23 of the backplane 15 and the connecting block 21. The resilience provided by the mounting 22 urges the block 21 towards the backplane 15 to provide a reliable contact. It has been found that when the card is removed and reinserted several times, the optical connection to the bus 1 remains substantially constant i.e. substantially invariant of the number of times that the card is inserted and removed. Furthermore, if the card is inserted into a further mounting at a different location on the bus, a substantially constant optical coupling occurs, irrespective of the location.

FIG. 6 shows the action of one of the ball bearings 25 or 26 shown in FIG. 5b. The ball 25 is received in a recess 24 in the connecting block 21 and is appropriately located therein. When the connecting block 21 is pressed in the forward direction towards the backplane 15, the ball presses into the groove 17 and it can be seen that the ball will centre itself within the groove and the centre line of the ball is so arranged as to be below the surface of the backplane 15 and as a result, an accurate alignment of the connecting block 21 and the backplane 15 will occur. Furthermore, if the backplane 15 and block 21 are misaligned as they are pressed together, the ball will tend to seek the groove 27 and self-align automatically, so as to achieve the desired alignment, the resilience of the mount 22, allowing relative movement of the connecting block 21 and the card 2 laterally of the forward direction, so that the desired alignment can be achieved.

Referring now to FIG. 7, this shows a modification in which the balls 25, 26 are replaced by an elongate rod 28 received in the connecting block 21. This functions in much the same way as the pair of balls 25, 26 but is received in the entire length of the grooves 27 in the backplane 15. The rod 28 may comprise a glass rod received in a channel in the connecting block 21 or alternatively may comprise a moulded protrusion integrally formed into the block 21.

Referring now to FIG. 8, this shows a sectional view through the block 21 and the backplane 15 in which, the channel, instead of being a narrow groove 27 is somewhat wider, forming a trough 29 with a bottom surface 30 and inclined sidewalls 31. The connecting block 21 is provided with a mesa 32 which is of a shape to fit into the trough 30. The D-fibres 23 are formed on the surface 33 so as to contact the fibres 1. Sidewalls 34 of the mesa 32 cooperate with the sidewalls 31 of the trough 29 so as to align the D-fibres with the desired intersection angle Φ. The connecting block 21 and backplane 15 may be formed into an appropriate shape by micromachining and/or moulding.

Referring to FIG. 9, this shows an alternative embodiment in which the backplane 15 is triangular in cross section and the connecting block 21 is formed with a cooperating complementary groove which is also triangular in cross section. The D-fibres 1, 23 are mounted in parallel sets on sidewalls of the triangular channel and the triangular projection. The fibres on the connecting block 21 are arranged parallel to one another but are inclined on the sidewall of the channel so as to produce the desired intersection angle Φ with the fibres of the backplane.

Referring to FIG. 10 in this arrangement the backplane 15 is provided with a step-channel, defined by a step 34. The connecting block 21 rests against the step 34 through two balls 35, 36, with the ball 36 being of larger diameter than ball 35. As a result, the optical D-fibres 23 are located at the desired angle Φ to the fibres 1.

Figure 11:
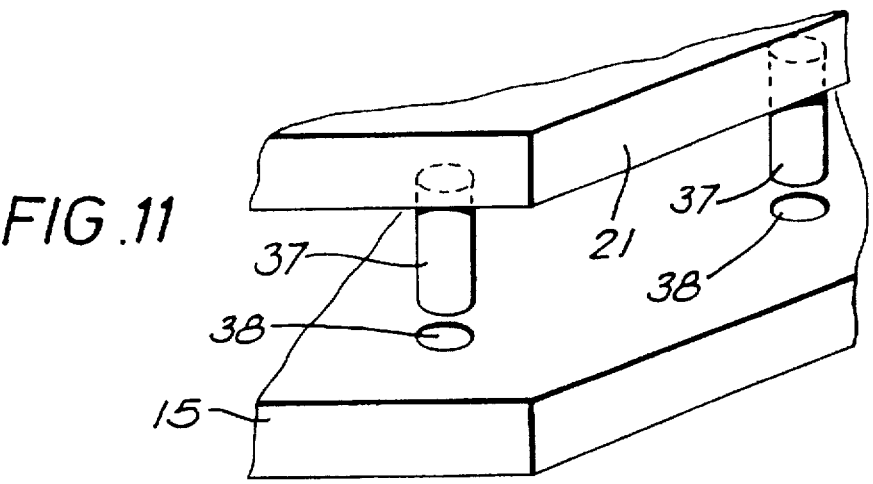
FIG. 11 is a schematic perspective view of an alternative coupling between the connecting block and the backplane.

As shown in FIG. 11, alternative way to mount the connecting block 21 on the backplane 15 is to provide upstanding projections 37 on the connecting block 21, which fit into bores 38 on the backplane 15. The D-fibres not shown are arranged in parallel sets as previously described, and the projections 37 cooperate with holes 38 to hold the fibre sets at a predetermined angle Φ in order to achieve the desired coupling.

Figure 12:
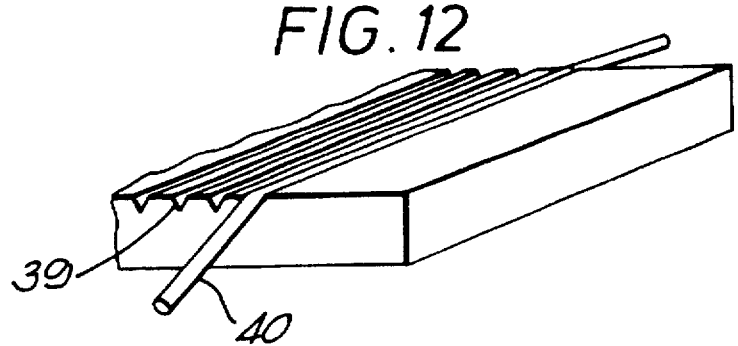
FIG. 12 is a schematic perspective view illustrating an alternative method of fabricating the backplane.

FIG. 12 shows an alternative way of forming the backplane 15 and the connector block 21. Instead of using pre-formed D-fibres that are pressed into the plastics substrate, conventional fibres may be mounted in pre-formed V-grooves 39 formed in the substrate; one fibre 40 is shown schematically. The resulting structure is then polished so as to form a flat upper surface, thereby removing the outer cladding of the fibres to produce the desired D-section.

Figure 13:
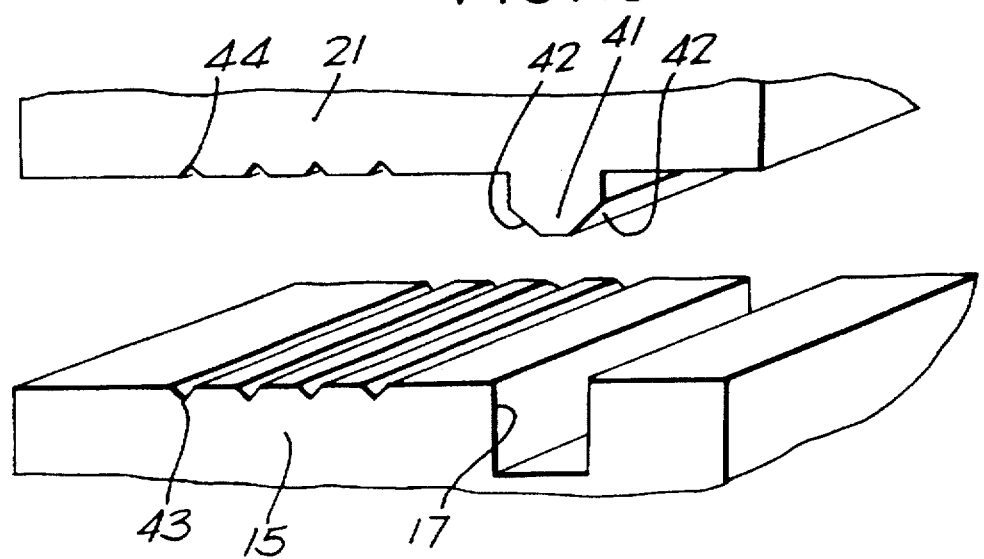
FIG. 13 illustrates schematically mouldings which can be used to form the backplane and connecting block for an interconnect in accordance with the invention.

FIG. 13 shows schematically blocks which may be used to form the connecting block 21 on the backplane 15. The blocks are formed by moulding and are illustrated prior to the insertion of the D-fibres 1, 23. The backplane 15 is provided with grooves 27 that receives a projection 41 integrally moulded into the connecting block 21. The projection 21 is provided with inclined side faces 42 in order to guide the projection into the groove 27 as the connecting block is moved into engagement with the backplane 15. V-shaped grooves 43, 44 are formed in the backplane 15 are block 21 in order to receive the D-fibres 1, 23 which, as previously explained, are located by hot pressing. The blocks are conveniently formed of plastics material, for example Noryl although other materials can be used.

It will be seen that with all of the described examples of interconnect, as the card 2 is pushed in the forward direction into the electrical connectors 18, 19, the connecting block 21 automatically self-aligns with the backplane 15, a transverse or rotational shift of the block 21 being permitted by the mounting 22 for the connecting block, so that a reliable and predictable optical coupling occurs.

A range of interconnects, with different intersection angles Φ can be produced, for different cards, so that different levels of optical coupling can be achieved from card to card.

In the described example, a single card 2 is shown. However, a pair of parallel cards can be used, with the connecting block 21 bridging the space between them.

As a modification, the optical D-fibres in the connecting block, could be replaced by other optical paths, for example oxide structures in a silicon substrate.

The racked structure described herein has particular application to telephone exchanges or like data transmission networks, but also can be used in other applications, such as optical data processing systems.

We claim:

1. An optical backplane interconnect comprising:
   a backplane including a plurality of optical bus waveguides;
   a connecting block provided with a plurality of optical paths to be aligned in a predetermined angular relationship with the bus waveguides of the backplane to form optical couplings therewith;
   coupling elements on the backplane and on the connecting block operative such that as the connecting block is moved in a forward direction towards the backplane, said coupling elements cooperate to cause the block automatically to shift laterally of said forward direction so as to produce self-alignment of the waveguides and the paths in said predetermined angular relationship.

2. An interconnect according to claim 1 wherein the backplane includes a plurality of substantially D-section optical fibres which in the region of the connecting block are substantially parallel to one another, and the optical paths in the connecting block include portions that are substantially parallel and spaced for coupling with respective ones of the optical fibres, said coupling elements holding the optical path portions at a predetermined angle relative to the optical fibres.

3. An interconnect according to claim 1 wherein the optical paths in the connecting block comprise a plurality of substantially D-section optical fibres.

4. An optical backplane interconnect comprising:

a backplane including a plurality of optical bus waveguides;

a connecting block provided with a plurality of optical paths to be aligned in a predetermined angular relationship with the bus waveguides of the backplane to form optical couplings therewith;

coupling elements operative such that as the connecting block is moved in a forward direction towards the backplane, the block is caused automatically to shift laterally of said forward direction to produce self-alignment of the waveguides and the paths in said predetermined angular relationship, wherein the backplane includes a plurality of substantially D-section optical fibres which in the region of the connecting block are substantially parallel to one another, and the optical paths in the connecting block include portions that are substantially parallel and spaced for coupling with respective ones of the optical fibres, said coupling elements holding the optical path portions at a predetermined angle relative to the optical fibres, and wherein the coupling elements include a channel formed in said backplane or said connecting block, and at least one locating element located against the channel to locate the connecting block on the backplane in said predetermined angular relationship.

5. An interconnect according to claim 4 wherein the channel comprises a groove in the backplane, and the coupling elements include at least one projection that fits into the groove.

6. An interconnect according to claim 5 wherein said at least one projection comprises an elongate member that runs longitudinally of the groove.

7. An interconnect according to claim 5 wherein said at least one projection includes a plurality of spaced members that fit into the groove.

8. An interconnect according to claim 5 wherein said at least one projection is received in a recess in the connecting block.

9. An interconnect according to claim 8 wherein said at least one projection comprises a ball.

10. An interconnect according to claim 5 wherein said at least one projection is formed integrally with the connecting block.

11. An interconnect according to claim 4 wherein the channel comprises a trough with a bottom surface in which the optical fibres are mounted.

12. An interconnect according to claim 11 wherein the trough is formed in the backplane, and the connecting block includes a mesa which includes said optical paths and which fits into the trough.

13. An interconnect according to claim 4 wherein the channel is triangular in transverse cross section, with the optical fibres being mounted in an inclined side face thereof.

14. An interconnect according to claim 4 wherein the channel is defined by a step edge in the back plane, and said coupling elements include spacer elements for producing a non uniform spacing between the step edge and the connecting block.

15. An interconnect according to claim 14 wherein the spacer elements comprise balls of different diameter.

16. An optical backplane interconnect comprising:

a backplane including a plurality of optical bus waveguides;

a connecting block provided with a plurality of optical paths to be aligned in a predetermined angular relationship with the bus waveguides of the backplane to form optical couplings therewith;

coupling elements operative such that as the connecting block is moved in a forward direction towards the backplane, the block is caused automatically to shift laterally of said forward direction to produce self-alignment of the waveguides and the paths in said predetermined angular relationship, wherein the backplane includes a plurality of substantially D-section optical fibres which in the region of the connecting block are substantially parallel to one another, and the optical paths in the connecting block include portions that are substantially parallel and spaced for coupling with respective ones of the optical fibres, said coupling elements holding the optical path portions at a predetermined angle relative to the optical fibres where said optical backplane interconnect further includes a card, a support on which the backplane is mounted, a first mount on the support for the card, and a second mount for resiliently mounting the connecting block on the card operative so that as the card is moved in the forward direction into the first mount the connecting block moves relative to the card to produce said self-alignment, wherein said card comprises a network card that carries optical and electrical circuit components, and said first mount for the card comprises an electrical edge connector mounted on the support to receive the network card.

17. An interconnect according to claim 16 including an electrical bus, the electrical connector being connected to the electrical bus.

18. An optical network interconnect comprising:

a support, a backplane mounted on the support, the backplane including a plurality of optical fibres, a network card, an edge connector mounted on the support to receive the network card, a connecting block mounted on the network card and provided with a plurality of optical paths to be coupled to the optical fibres in the backplane respectively, and coupling elements comprising a mutually cooperating coupling member and receptacle arrangement which provides a coupling between the connecting block and the backplane in a predetermined configuration, whereby to couple the optical paths of the connecting block to the optical fibres in the backplane, such that upon insertion of the card into the edge connector, the coupling elements are operative to couple the connecting block to the backplane in said predetermined configuration.

19. An interconnect according to claim 18 wherein the coupling elements include pins which fit into cooperating holes, the pins and holes being formed in the backplane and the connecting block.

20. An interconnect according to claim 18 wherein the connecting block is mounted on an edge of the network card and extends transversely thereof.

21. An interconnect according to claim 20 wherein the connecting block is resiliently mounted on the network card.

22. An optical backplane interconnect comprising:

a backplane including a plurality of optical bus waveguides:

a connecting block provided with a plurality of optical paths to be aligned in a predetermined angular relationship with the bus waveguides of the backplane to form optical couplings therewith;

coupling elements operative such that as the connecting block is moved in a forward direction towards the backplane, the block is caused automatically to shift laterally of said forward direction to produce self-alignment of the waveguides and the paths in said predetermined angular relationship, and including a card, a support on which the backplane is mounted, a first mount on the support for the card, and a second mount for resiliently mounting the connecting block on the card operative so that as the card is moved in the forward direction into the first mount the connecting block moves relative to the card to produce said self-alignment.

23. An optical backplane interconnect comprising:

a backplane including a plurality of optical bus waveguides;

a connecting block provided with a plurality of optical paths, and coupling elements arranged to align said optical paths in a predetermined angular relationship with the bus waveguides of the backplane so as to form optical couplings therewith, wherein the improvement comprises:

an arrangement of coupling elements on the backplane and on the connecting block which, as said connecting block is moved in a forward direction towards said backplane, cooperates to cause said block automatically to shift laterally of said forward direction to produce self-alignment of said waveguides and said paths in said predetermined angular relationship.

* * * * *